US00H002077H

(19) United States

(12) Statutory Invention Registration

Opdycke

(10) Reg. No.: US H2077 H

(43) Published: Aug. 5, 2003

(54) COMPOSITION AND PROCESS FOR DURABLY MODIFYING SURFACES OF NORMALLY HYDROPHOBIC SOLID SYNTHETIC POLYMERS AND CURED PAINTS TO FACILITATE SPREADING OF AQUEOUS LIQUIDS OVER THE SURFACES

(75) Inventor: Walter N. Opdycke, Livonia, MI (US)

(73) Assignee: Henkel Corporation, Gulph Mills, PA (US)

(21) Appl. No.: 09/637,199

(22) Filed: Aug. 11, 2000

Related U.S. Application Data

(60) Provisional application No. 60/148,494, filed on Aug. 12, 1999.

(51) Int. Cl.[7] ..... B05D 3/02; B05D 3/00

(52) U.S. Cl. ..... 427/385.5; 427/353

*Primary Examiner*—Michael J. Carone
*Assistant Examiner*—Aileen B. Felton
(74) *Attorney, Agent, or Firm*—Wayne C. Jaeschke; Stephen D. Harper; Norvell E. Wisdom, Jr.

(57) ABSTRACT

Dispersions in water of "poly{vinyl alcohol}" ("PVA"), preferably those types resulting from about 90 mole % hydrolysis and/or ester interchange of polymers of vinyl carboxylates and having a molecular weight of about 155, 000, are particularly effective for modifying the surfaces of plastic materials to cause water and/or other specified liquids to spread more readily over the treated surfaces than over the untreated surfaces. A biocide to repress the growth of micro-organisms in the dispersions is preferred.

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMPOSITION AND PROCESS FOR DURABLY MODIFYING SURFACES OF NORMALLY HYDROPHOBIC SOLID SYNTHETIC POLYMERS AND CURED PAINTS TO FACILITATE SPREADING OF AQUEOUS LIQUIDS OVER THE SURFACES

CROSS-REFERENCE TO RELATED APPLICATIONS

Priority for this application is claimed under 35 U.S.C. § 119(e) from application Ser. No. 60/148,494 filed Aug. 12, 1999.

STATEMENT REGARDING FEDERALLY SPONSORED RESEARCH OR DEVELOPMENT

Not applicable.

BACKGROUND OF THE INVENTION

This invention relates to compositions and processes for modifying the surfaces of solid synthetic polymers and/or cured paints, so that, after the modification and subsequent rinsing and/or drying, freshly applied liquids, especially water, that subsequently come into contact with the modified surfaces will spread more readily over the modified surfaces than over the same surfaces before they were subjected to the modifying process.

Many common synthetic polymer materials have surfaces on which water and other aqueous compositions tend to form discrete beads or clumps, often known in the art as water "breaks", "beads", or "droplets", rather than even sheets. This property makes it inconvenient to obtain uniform modifications or treatments of the surface properties of such synthetic polymers by any method of contact with aqueous solutions except total immersion of the synthetic polymer in the aqueous solutions, because the ingredients in the aqueous solutions that are effective to modify the synthetic polymer surfaces are non-uniformly distributed over the synthetic polymer surfaces by any other method of contact. Even with immersion, non-uniformity may still occur because of non-uniformity of distribution of residual treatment compositions, before they can be rinsed away or otherwise removed from the synthetic polymer surfaces being treated, after discontinuing the immersion treatment.

Treatments using methods of contact other than immersion are usually more convenient than immersion. Contact methods that include spraying and/or some other means of contact that is not immersion also usually clean more effectively in a short time than do immersion treatments, as a result of mechanical loosening of soil particles by impinging spray or by other means used to establish contact between a liquid and a solid surface without immersing the solid surface in the liquid. Therefore, the above-noted tendency toward non-uniformity in the treatment of synthetic polymer surfaces with aqueous solutions is a significant practical handicap to the surface finishing of synthetic polymer substrate materials in high speed processing equipment. Only when the treatment liquid that is being used to treat a solid surface spreads spontaneously to form liquid sheets with substantially even thickness over the entire surface is it possible reliably to avoid the formation of "spots" of isolated treatment liquid on the surface. If the treatment liquid contains any constituents that are not volatilized under the subsequent conditions of treatment of the surface, such constituents are inevitably concentrated in these spots, after all of the volatile constituents of the treatment liquid in the spots have volatilized. Such irregularities in the chemical composition of the surface are a frequent cause of blemishes in subsequent coatings, particularly paints.

This invention does not relate, except possibly incidentally, to wetting agents, i.e., to materials that can be added to a particular aqueous composition to make that composition itself spread more uniformly over the surface of a synthetic polymer or other hydrophobic material. Wetting agents are very effective in improving wetting, but have at least two serious disadvantages: They are expensive to use, because a substantial amount of wetting agent is adsorbed on the plastic surface being rinsed at one stage during processing and then rinsed off and lost during another stage; and even small amounts of wetting agents, that do remain on the plastic surfaces usually spoil the uniformity of subsequent paint finishes applied over them.

In contrast, this invention is concerned with a durable modification of the surface of the synthetic polymer itself, so that, after the treatment that modifies the surface according to this invention, the modified surface will be more uniformly wetted during subsequent contacts of the modified surface with aqueous liquid compositions, and in many instances will also be more nearly uniformly wetted by at least some liquids other than water. The bulk of the description below will focus on spreading of liquid water, aqueous solutions, and/or dispersions in which water is the continuous phase, all of which are jointly denoted herein as "aqueous liquid compositions", but the description also applies, mutatis mutandis, to spreading of other liquids as well. Organic solvent based paints and adhesives, which are often used on engineering plastics, for example, also spread more readily on at least some synthetic polymer surfaces after they have been modified according to this invention.

Various compositions and processes for durably increasing the hydrophilicity of synthetic polymer surfaces have been taught in the art, but none has proved to be fully satisfactory, particularly for polyolefin and TPO materials, which are exceptionally hydrophobic and low in chemical reactivity, even by comparison to most other synthetic polymers, and have been observed to be almost unaffected by some treatments that effectively hydrophilicize other synthetic polymer surfaces. Some of these treatments taught by other art have been found to be ephemeral in their effectiveness, producing surfaces that have good water wetting for a few hours after treatment but become hydrophobic again within a few days; some of these and some others of the treatment compositions are costly and/or polluting.

A major object of the invention is to overcome one or more of the difficulties described above with treatments taught in other art. Other alternative or concurrent objects are to improve the useful life of treatment compositions and/or the durability of the surface modifying effects over those described in other art. Other objects will be apparent from the description below.

Except in the claims and the specific examples, or where otherwise expressly indicated, all numbers in this description indicating amounts of material or conditions of reaction and/or use are to be understood as modified by the word "about" in describing the broadest scope of the invention. Practice within the numerical limits stated is generally preferred, however. Also, throughout this specification, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, or as reduced or increased in amount in situ by chemical reactions explicitly stated in the description, and does not necessarily preclude unstated chemical interactions among the constituents of a mixture once mixed; specification of materials in ionic form additionally implies the presence of sufficient counterions to produce electrical neutrality for the composition as a whole (any counterions thus implicitly specified should preferably be selected from among other constituents explicitly specified in ionic form, to the extent possible; otherwise such counterions may be freely selected, except for avoiding counterions that act adversely to the objects of the invention); the term "mole" means "gram mole" and the term itself and its grammatical variations may be applied to elemental, ionic, unstable, hypothetical, and any other chemical species defined by number and type of atoms present, as well as to compounds with well defined molecules; the term "paint" includes all like materials commonly described by more specialized terms such as shellac, enamel, varnish, top coats, primers, clear coats, radiation curable coating compositions, etc.; and the term "plastic surfaces" and normal grammatical variations thereof includes surfaces of all solid synthetic polymer materials and of paints normally dried or cured as intended for ultimate use, irrespective of the substrate underlying the dried or cured paints.

BRIEF SUMMARY OF THE INVENTION

It has been found that dispersions in water of "poly{vinyl alcohol}"[1] (hereinafter usually abbreviated as "PVA"), preferably those types resulting from incomplete hydrolysis and/or ester interchange of polymers of vinyl carboxylates, are particularly effective for modifying the surfaces of plastic materials to cause water and/or other specified liquids to spread more readily over the treated surfaces than over the untreated surfaces. The presence of a biocide to repress the growth of micro-organisms in the solutions is optional and preferred. The presence of surfactant (exclusive of any surfactant that might be used to stabilize the PVA) and certain other ingredients in the solutions is optional but not normally necessary or preferred; many surfactants can frustrate the objects of the invention if present along with PVA and therefore should be excluded.

[1] It is, of course, well known that "vinyl alcohol" is too unstable to exist under normal conditions and therefore can not be polymerized directly. The materials commonly known as "poly{vinyl alcohol}" are produced by hydrolysis of and/or ester interchange with other polymers, most often polymers of vinyl acetate.

DETAILED DESCRIPTION OF THE INVENTION

Surfaces that can be advantageously modified according to this invention include, but are not limited to, polyester sheet molding compound (hereinafter usually abbreviated as "SMC"); poly{vinyl chloride} (hereinafter usually abbreviated as "PVC") homopolymers and copolymers; polyurethane and polyurea plastic surfaces such as those of objects made commercially by injection molding from these plastics; terpolymers of acrylonitrile, butadiene, and styrene (hereinafter usually abbreviated as "ABS"); polyamides, particularly (i) elimination copolymers of (i.1.1) phthalic acid(s) and/or (i.1.2) esters thereof and (i.2) diamines and (ii) homopolymers of lactams; poly{phenylene oxide} (hereinafter usually abbreviated as "PPO") and copolymers of "phenylene oxide" with other materials such as polyamides; polycarbonate (hereinafter usually abbreviated as "PCO") polymers and copolymers; and, most particularly, polyolefins, especially blends of polyolefins with synthetic elastomeric polymers such as ethylene-propylene-diene monomer polymers, these blends being known as "thermoplastic polyolefin(s)" (hereinafter usually abbreviated as "TPO").

One embodiment of the invention is a liquid treatment composition that is capable of modifying a plastic surface by contact therewith for a sufficient time at a sufficient temperature so that, after the contact has been completed and the modified surface has been rinsed with solvent and/or dried, at least one of the following two conditions is satisfied:

(i) a specified liquid has an advancing contact angle on the modified plastic surface that is smaller than the advancing contact angle that a separate sample of the same specified liquid has on an unmodified sample of the same plastic surface; or (ii) when the modified plastic surface is immersed in a specified liquid and then withdrawn and allowed to drain under the influence of natural gravity for at least one time from 10 to 60 seconds in the natural atmosphere at 25° C. with a relative humidity of at least 50%, the fraction of the surface after draining that is covered by the largest single continuous substantially evenly thick[2] covering of the specified liquid on the entire surface is larger than that observed in an otherwise identical test on an unmodified sample of the same plastic surface, said liquid treatment composition comprising, preferably consisting essentially of, or more preferably consisting of, solvent and the following components:

(A) a dissolved, dispersed, or both dissolved and dispersed, component of PVA; and, optionally, one or more of the following components:

(B) a component of biocide that does not constitute part of any of immediately previously recited component (A);

(C) a component of surfactant that does not constitute part of either of the immediately previously recited components (A) and (B);

(D) a component of coloring agent that does not constitute part of any of the immediately previously recited components (A) through (C);

(E) a component of other polymers that do not constitute part of any of the immediately previously recited components (A) through (D); and (F) a component of cross-linking agents for PVA that are not part of any of the immediately

[2] After draining, as much of the surface as possible should be kept horizontal for making this evaluation. On any part of the surface that is not horizontal, the inherently greater thickness at the bottom than the top of any continuous sheet of liquid, as a consequence of the gravitational attraction of the earth, should not be considered as a deviation from a "substantially evenly thick" sheet. Otherwise, any variation in thickness over the surface that is readily perceptible with normal unaided human vision is to be considered "substantial". Ordinarily, there will be no difficulty in seeing the effect of the modification according to the invention, because on a typical surface being treated, before modification water will normally cling to the surface only in many discrete droplets, with no large sheets of substantially even thickness, while after modification most or all of the surface will be covered with a continuous substantially evenly thick sheet of water. This latter behavior is preferred. previously recited components (A) through (E).

Another embodiment of the invention is a concentrate composition that is suitable to be diluted with solvent to form a working liquid composition as described immediately above. A concentrate composition according to the invention preferably contains component (A), along with any other of components (B) through (E) that are desired in the working composition to be made from the concentrate composition, in a concentration that is at least, with increasing preference in the order given, 5, 10, 25, 50, 75, 100, 150, 300, 500, 750, 1000, 1500, 2000, 2500, 3000, or 3500 times as large as the concentration of the same component that is specified below as preferable for that component in working compositions according to the invention.

For reasons of economy and convenience, the solvent for a composition according to the invention is preferably water in most instances. However, any other solvent that is capable of dissolving the components noted above as required to be dissolved and that does not damage the plastic surface to be treated can be used and may be advantageous in certain instances. The remainder of this description will describe preferred aqueous compositions in which water is the predominant constituent, but it is to be understood that other solvents can be used either alone or in a mixture with water and that the description applies also to them, mutatis mutandis.

Component (A) is preferably selected from PVA made by hydrolysis of polymers of alkenyl carboxylates that have, with increasing preference in the order given, not more than 10, 8, 7, 6, 5, or 4 carbon atoms per molecule and independently preferably have at least 4 carbon atoms per molecule. Further and independently, the alkenyl moiety in an alkenyl carboxylate residue in a polymer molecule selected for component (A) preferably has not more than, with increasing preference in the order given, 6, 5, 4, 3, or 2 carbon atoms per alkenyl moiety. The extent of hydrolysis of these precursor poly{vinyl carboxylate} polymers to produce the actual PVA used in the invention preferably is at least, with increasing preference in the order given, 25, 50, 60, 75, 80, 84, or 88% and independently preferably is not more than, with increasing preference in the order given, 99, 97, 95, 93, or 91%. The percentage basis for the extent of hydrolysis is not weight but moles, or in other words the percentage of the number of moles of residues of vinyl carboxylate monomers in the polymers that have been converted to have hydroxyl rather than ester side groups. Independently of other preferences, the weight average molecular weight of the PVA materials selected for component (A) preferably is at least, with increasing preference in the order given, 10,000, 20,000, 30,000, 40,000, 50,000, 60,000, 70,000, 80,000, 90,000, 100,000, 110,000, 120,000, 130,000, 140,000, 147,000, or 154,000 and independently preferably is not more than, with increasing preference in the order given, 1,000,000, 900,000, 800,000, 700,000, 600,000, 500,000, 400,000, 300,000, 250,000, 200,000, 190,000,180,000,170,000, or 160,000. With lower molecular weight types of PVA, any increased wetting attained on the surfaces treated is usually not durable to much rinsing with water, while with higher molecular weight types of PVA, the treatment solutions are likely to have too high a viscosity for convenient use by spraying as is preferred, and the degree of wetting improvement obtained may be unsatisfactory.

Irrespective of the chemical nature of component (A) within the limits given above, the concentration of the component in a working composition according to the invention preferably is at least, with increasing preference in the order given, 0.0040, 0.0060, 0.0080, 0.010, 0.013, 0.015, 0.017, 0.019, 0.025, 0.030, 0.035, 0.040, 0.045, or 0.050 parts of component (A) per thousand parts of total working composition (a concentration unit that may be used hereinafter for any material dissolved, dispersed, or both dissolved and dispersed in a composition as well as for component (A) and is hereinafter usually abbreviated as "ppt") and independently, primarily for reasons of economy, preferably is not more than, with increasing preference in the order given, 2.0, 1.0, 0.75, 0.62, 0.50, 0.40, 0.35, 0.30, 0.25, 0.20, 0.15, or 0.10 ppt.

It has been found that compositions according to the invention containing only water and component-(A) are often capable of supporting the growth of micro-organisms introduced spontaneously from the environment. Accordingly, a separate biocidal component (B) usually is preferably present-in a composition according to the invention, particularly in a concentrate composition. Numerous biocidal materials and preferred concentration ranges for their use are known to those skilled in the art. Preservatives containing isothiazolin-3-one moieties are particularly suitable; more particularly a mixture of the commercial products KATHON™ 886 MW and 893 MW preservatives from Rohm and Haas Co. is utilized. KATHON™ 886 MW is reported by its supplier to contain 10–12% of 5-chloro-2-methyl-isothiazolin-3-one and 3–5% of 2-methyl-isothiazolin-3-one as its preservative active ingredients along with 14–18% of magnesium nitrate and 8–10% of magnesium chloride, all in water solution with water as the balance, and to be particularly effective against bacteria. KATHON™ 893 MW is reported by its supplier to contain 45–48% of 2-n-octylisothiazolin-3-one and 52–55% of propylene glycol. Accordingly, a composition according to the invention in which a preservative is desired preferably contains, independently for each material noted, at least, with increasing preference in the order given: 0.50, 0.75, 0.90, 1.00, 1.10, 1.20, 1.30, or 1.37 parts per million by weight of the total composition, hereinafter usually abbreviated as "ppm", of 5-chloro-2-methyl-isothiazolin-3-one; 0.10, 0.20, 0.25, 0.30, 0.35, 0.40, 0.45, or 0.48 ppm of 2-methyl-isothiazolin-3-one; and 0.75, 1.00, 1.50, 2.00, 2.25, 2.45, 2.60, 2.75, or 2.90 ppm of 2-n-octyl-isothiazolin-3-one. Also, independently of other preferences and independently for each material noted, a composition according to the invention preferably contains not more than, with increasing preference in the order given: 10, 8, 6, 4.0, 3.0, 2.5, 2.0 or 1.5 ppm of 5-chloro-2-methyl-isothiazolin-3-one; 5, 3, 2.0, 1.5, 1.0, 0.8, 0.6, or 0.54 ppm of 2-methyl-isothiazolin-3-one; and 25, 15, 10, 8, 6, 5.0, 4.0, 3.7, 3.4, 3.2, or 3.0 ppm of 2-n-octyl-isothiazolin-3-one, all of the preferences stated in this sentence being primarily for reasons of economy.

Surfactant component (C) is useful in particular instances to promote initial wetting of the plastic surface to be treated by a working composition according to the invention and/or to prevent undesirable foaming, particularly when the composition is used by spraying. Suitable materials are known to those skilled in the art. Ordinarily, surfactants have not been found to be particularly advantageous in compositions according to the invention and therefore are preferably omitted for economy.

Coloring agent component (D) is not known to have any technical effect on compositions according to the invention, and therefore is not normally used. In certain instances, however, it is advantageous for marketing or if a color change in the plastic surface treated is desired for some aesthetic reason or as an indicator of adequacy of treatment. A wide variety of suitable dyes and/or pigments for achieving such purposes are known to those skilled in the art.

Many other polymers, including polymers of vinyl carboxylates, are dispersed in water with the aid of PVA materials as required for component (A) of a composition according to this invention. Inasmuch as the concentration of PVA required for a working composition according to the invention is rather small, it is often possible to obtain satisfactory durable wetting improvement by using other polymers that are dispersed with PVA[3]. Furthermore, other polymers, particularly those taught in U.S. Pat. No. 5,298,589 of March 29, 1994 to Lindert et al., can have an adjuvant effect on the hydrophilicity of the surfaces treated in a process according to this invention and/or confer other desirable specialized properties on the surfaces treated. All such other polymers have accordingly been designated as optional component (E) in a composition according to the invention, but for reasons of economy, they normally preferably are not included.

[3] As merely one example, common opaque white general purpose household adhesive is often poly{vinyl acetate} dispersed with PVA.

Cross-linking agents for PVA materials generally are known in the art and may optionally be added to compositions according to this invention, especially if extremely long lasting rinsability improvements are desired, particularly after exposure of the treated surface to high temperatures. Ordinarily, however, cross-linking agents are not needed to obtain satisfactory results in most applications and are therefore preferably omitted for economy.

In its simplest form, a process according to another major embodiment of this invention consists of establishing contact between an aqueous liquid working composition according to the invention or useful in the invention and a plastic surface to be treated, for a sufficient time at a sufficient temperature to improve the ability of liquids, especially water, to spread spontaneously over the treated surface after discontinuance of contact between the surface and the working composition according to the invention, followed by at least one of the steps of (i) rinsing with water and (ii) drying after discontinuance of contact. Contacting between the surface and the liquid composition in a process according to the invention may be accomplished by any convenient method, such as immersing the surface in a container of the liquid composition, spraying the composition on the surface, roll coating a flat surface, or the like, or by a mixture of methods. Spraying is normally preferred, primarily for convenience and speed of effective treatment; no significant difference between high and low impact spraying has been observed.

A composition according to the invention may be maintained during its use at any temperature between just above the freezing point and just below the boiling point of the aqueous liquid working composition according to the invention. However, if a substantial improvement in spreading properties within a short time is desired, it is preferred that the temperature during contact between the solid surface to be treated and a liquid working composition according to the invention should be at least, with increasing preference in the order given, 5, 7, 9, 11, or 13° C. Independently, in order to obtain the maximum improvement in rinsability, it is preferred that the temperature during contact between the solid surface to be treated and a liquid working composition according to the invention preferably is not more than, with increasing preference in the order given, 80, 60, 50, 40, 37, 35, 33, 31, or 29° C. and, if adequate time is available and cheap, more preferably for maximum economy should be the ambient temperature that will be achieved in the operation if neither heating nor cooling means are used to affect specifically the temperature of the composition according to the invention (as contrasted to controlling the ambient atmospheric temperature for human comfort).

A time of at least 30 minutes for contact between a composition according to the invention and the surface to be treated is suitable, but for high speed processing lines such times are usually impractical. Significant surface modifications can be achieved with a process according to this invention during contact times at least as short as 2 seconds, although somewhat more durable modifications of the initially most hydrophobic substrates such as TPO are obtained with longer contact times. Ordinarily, primarily for reasons of economy, it is preferred that the time of contact should be greater than is needed to accomplish the degree of modification desired, or more specifically should not be greater than, with increasing preference in the order given, 30, 15, 10, 5, 3.0, 2.5, 2.0, 1.5, 1.0, 0.8, 0.6, 0.4, 0.2, or 0.1 minutes.

Preferably, after completion of a process according to the invention, the advancing contact angle of pure water on the modified surface of the plastic substrate processed according to the invention is lower than the advancing contact angle of pure water on the same surface before modification by an increment that is at least, with increasing preference in the order given, 5, 8, 11, 14, 17, 20, 23, 26, or 29°. Independently, the preferred level of decrease in the advancing contact angle as described above persists after the modified surface has been dried and exposed to ambient air for a time of at least, with increasing preference in the order given, 3, 5, 8, 12, 17, 23, 30, 60, 90, 120, 150, or 180 days.

The physico-chemical mechanism by which improved liquid spreading properties are produced in a process according to the invention is not known, but at least a part of the mechanism is believed to include absorption of constituents of component (A) as described above into, and/or strong adsorption of such constituents on, the plastic surface that is modified.

Other embodiments of the invention are extended processes that combine a narrow process according to the invention as described above with a later process that makes advantageous use of the improved liquid spreading tendency and/or the enhanced chemical reactivity produced on a surface in the process. Among various non-limiting examples of such process extensions that are improved on surfaces modified according to the invention are: improved uptake of aqueous based dyes, printing inks, and the like; improved spreading and flowing, and/or reduced pinholing and dewetting, of solvent and water based paints; better electrostatic painting, because of increased electrical conductivity; and a wider range of applicable surface treatments, because of reactivity with residual functional groups on the modified surfaces and/or facilitation of access by other chemical reagents to the interior of a plastic body as a consequence of modification of the surface of the plastic body.

Other embodiments of the invention include articles manufactured by a process according to the invention as described above and processes for making working compositions according to the invention as described above.

The practice of this invention may be further appreciated from the following, non-limiting, working examples and the benefits of the invention may be further appreciated from comparison with the following comparison examples.

EXAMPLE AND COMPARISON EXAMPLE GROUP 1

In this group, polymers that are not primarily PVA materials but that include the latter as dispersing agents were tested. Contact between the treatment liquid and the solid plastic TPO substrates was by spraying in all steps except drying, and the processing sequence was:

1. Clean with a solution of 2% of POWER-WASH™ 3293 Cleaner concentrate[4] in water for 70 seconds (hereinafter usually abbreviated as "sec") at about 25° C.
2. Rinse for 30 sec in hot tap water.
3. Contact with working composition according to the invention or comparison (see details in Table 1 below).

4. Rinse for 30 sec with hot tap water.
5. Rinse for 30 sec with ambient temperature deionized water.
6. Blow dry with compressed air.

[4]Product commercially available from Henkel Surface Technologies Div. of Henkel Corp., Madison Heights, Mich.

The source of the PVA used was Elmer's™ Washable School Glue (hereinafter usually abbreviated as "ESG"), a consumer product manufactured by Borden Co. and believed to be a dispersion in water of about 40% poly{vinyl acetate} dispersed with the aid of a PVA dispersing agent. Further details are given in Table 1. The "sheet rinsing rating" in Table 1 is the result of a visual estimation test of the extent to which rinse water runs off is a treated substrate in a continuous sheet. A rating of "5" is the highest; in this, water continues to run off the treated sheet in a single sheet until the water is too depleted by runoff and/or evaporation to continue to run at all. A rating of "0" means that the water shows areas of obviously uneven thickness within two to three seconds after rinsing.

TABLE 1

| Contact Time % ESG in Step 3 | Rating in Step 3, Sec | Sheet Rinsing Rating after Step 3 | Sheet Rinsing after Step 6 |
|---|---|---|---|
| None - Control | Not used | Not applicable | 1 |
| 0.03 | 30 | 3+ | 3 |
| | 60 | 3+ | 2+ |
| 0.06 | 30 | 4 | 3 |
| | 60 | 3+ | 3+ |
| 0.09 | 30 | 4 | 3+ |

EXAMPLE GROUP 2

In this group, polymers that were predominantly PVA materials that were made from poly{vinyl acetate} precursors were used, with the general process sequence the same as in Group 1. Details and results are given in Table 2 below. For materials in Table 2 that had a rinse rating of 3.5 or more after drying, the ratings were maintained even after the surfaces had been rinsed continuously with flowing water for two or more hours.

TABLE 2

| Characteristics of the PVA Used in the Composition according to the Invention | | | Sheet Rinse Rating |
|---|---|---|---|
| Mole % - OH | Molecular Weight | Concentration, % | After Drying |
| 75 | 3,000 | 0.0020 | 2 |
| 88 | 22,000 | 0.0020 | 4 |
| | 88,000 | 0.0020 | 4.5 |
| | 156,000 | 0.0020 | 4.5 |
| 95 | 95,000 | 0.0020 | 4.5+ |
| 98 | not known | 0.0020 | 3.5 |
| 99 | 120,000 | 0.0020 | 4 |

EXAMPLE GROUP 3

In this group attention was concentrated on PVA materials stated by their manufacturer to have 88 mole % —OH and a molecular weight of about 156,000 (AIRVOL™ 540 and 840 products commercially obtained from Air Products Co., with the only difference between the two products stated to be the presence of an antifoaming agent in 840 and its absence in 540). Process steps were the same as in Group 1, with a 30 second contact time between the PVA solution and the test panels. Further data and results are given in Table 3 below. The abbreviation "n.m." in Table 3 means "not measured". The PVA without antifoam agent gives at least slightly better results, but both would be acceptable in many uses. The PVA without antifoam agent can result in considerable foaming when dissolved to make a concentrate, especially when the concentrate is heated to speed the dissolution of the initially solid PVA, as is generally needed. However, with care in dissolving, the foam can be tolerated, so that the PVA without antifoam agent is normally preferred.

TABLE 3

| | Results with Product 540 | | Results with Product 840 | |
|---|---|---|---|---|
| Concentration of PVA in Parts per Million | Sheet Rating Number | % of Surface Remaining Water-Covered after 10 Seconds | Sheet Rating Number | % of Surface Remaining Water-Covered after 10 Seconds |
| 0.1 | 2 | 20 | 2 | 10 |
| 0.2 | 2 | 30 | 2+ | 20 |
| 0.5 | 2.5 | 40 | 2.5 | 30 |
| 1.0 | 3 | 50 | 2.5 | 35 |
| 2.0 | 3 | 70 | 3 | 60 |
| 3.0 | 3.5 | 90 | 3 | 50 |
| 4.0 | 4 | 90 | 3 | 60 |
| 5.0 | 4 | 90 | 3° | 60 |
| 6.0 | 3.5 | 70 | 3.5 | 70 |
| 7.0 | 3.5 | 70 | 3.5 | 70 |
| 8.0 | 3.5 | 70 | 3.5 | 70 |
| 10 | 4 | 90 | 3.5 | 80 |
| 15 | 4 | 90 | n.m. | n.m. |
| 20 | 4 | 90 | 4 | 90 |
| 30 | 4.5 | 95 | 4.5 | 95 |
| 40 | 4.5 | 95 | 4.5 | 95 |
| 50 | 4.5 | 95 | 4.5 | 95 |
| 60 | 4.5 | 95 | 4.5+ | >95 |
| 75 | 5 | >95 | 4.5 | 95 |
| 100 | n.m. | n.m. | 4.5 | 95 |
| 300 | 4.5 | 95 | 4.5 | 95 |

The invention claimed is:

1. A process for durably improving the spontaneous spreading tendency of at least one specified liquid over a plastic or painted surface, said process comprising steps of:

(I) maintaining contact for a specified time between the plastic or painted surface and a liquid composition comprising water and at least 0.0040 ppt of poly{vinyl alcohol} ("PVA"), so as to produce a modified plastic or painted surface;

(II) after completion of step (1), separating the modified plastic or painted surface from any of said liquid composition other than that which fails to drain from the plastic or painted surface under the influence of natural gravity; and at least one of:

(III.1) drying the painted or plastic surface as separated at the end of step (II) or (III.2) rinsing the painted or plastic surface as separated at the end of step (II) with a sufficient amount of solvent that any liquid which fails to drain from the surface under the influence of natural gravity after such rinsing has a concentration of PVA that is no greater than 1.0% as much as the concentration of PVA in the liquid composition contacted with the plastic or painted surface in step (I), wherein the specified time in step (I) is sufficiently long that at least one of the following two conditions is satisfied: (i) a fresh sample of the specified liquid has an advancing contact angle on the modified plastic or painted surface that is smaller than the advancing contact angle that a separate sample of the specified liquid has on a sample of the same plastic or painted surface before modification; and (ii) when the modified plastic or painted surface is immersed in the specified liquid and then withdrawn and allowed to drain under the influence of natural gravity for at least one time that is at least 30 seconds in the natural atmosphere at 25° C. with a relative humidity of at least 50%, the fraction of the surface after draining that is covered by the largest single continuous substantially evenly thick covering of the specified liquid on the entire surface is larger than that observed in an otherwise identical test on an unmodified sample of the same plastic surface.

* * * * *